United States Patent
Shimizu (10) Patent No.: US 7,664,116 B2
(45) Date of Patent: Feb. 16, 2010

(54) NETWORK BASED ROUTING SCHEME

(75) Inventor: Takeshi Shimizu, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 849 days.

(21) Appl. No.: 11/398,257

(22) Filed: Apr. 4, 2006

(65) Prior Publication Data

US 2006/0227779 A1 Oct. 12, 2006

Related U.S. Application Data (60) Provisional application No. 60/670,369, filed on Apr. 12, 2005.

(51) Int. Cl.
*H04L 12/28* (2006.01)
(52) U.S. Cl. .................... 370/395.5; 370/400
(58) Field of Classification Search .............. 370/395.5, 370/400, 466
See application file for complete search history.

(56) References Cited

U.S. PATENT DOCUMENTS

| | | | |
|---|---|---|---|
| 5,872,783 A | 2/1999 | Chin | 370/392 |
| 6,873,602 B1 * | 3/2005 | Ambe | 370/254 |
| 6,922,749 B1 | 7/2005 | Gil et al. | 710/316 |
| 6,934,283 B1 | 8/2005 | Warner | 370/380 |
| 6,944,670 B2 * | 9/2005 | Krichevski et al. | 709/230 |
| 7,072,335 B1 * | 7/2006 | Kadambi et al. | 370/389 |
| 7,453,884 B2 * | 11/2008 | Ma | 370/395.32 |
| 2001/0005369 A1 | 6/2001 | Kloth | 370/392 |
| 2002/0161923 A1 | 10/2002 | Foster et al. | 709/239 |
| 2002/0184529 A1 | 12/2002 | Foster et al. | 713/201 |
| 2003/0131131 A1 | 7/2003 | Yamada et al. | 709/238 |
| 2004/0213237 A1 | 10/2004 | Yasue et al. | 370/392 |
| 2005/0053006 A1 | 3/2005 | Hongal et al. | 370/236.2 |
| 2005/0281267 A1 * | 12/2005 | McFadden et al. | 370/395.1 |
| 2006/0007939 A1 * | 1/2006 | Elangovan | 370/395.53 |
| 2006/0013141 A1 * | 1/2006 | Mutoh et al. | 370/241 |

FOREIGN PATENT DOCUMENTS

WO WO 01/43354 A2 6/2001

OTHER PUBLICATIONS

EPO European Search Report for Application No./Patent No. 06007589.2-1249, Reference No. 114 628 a/npo, Applicant: Fujitsu Ltd., 13 pages, Feb. 5, 2007.

(Continued)

*Primary Examiner*—Creighton Smith
(74) *Attorney, Agent, or Firm*—Baker Botts L.L.P.

(57) ABSTRACT

A network organization and routing scheme are provided. These techniques enable a network to control the paths that frames take through the network. A device transmitting a frame may add tags to the frame in order to define a particular path that the frame should take through the network. For example, the tags may indicate a link-by-link path between switches in the network. As another example, the network may be organized into one or more groups of switches, with each group and switch within a group having unique identifiers so that any given switch or port in the network may be referred to by a hierarchical identification, such as a group/switch/port identification.

23 Claims, 5 Drawing Sheets

OTHER PUBLICATIONS

Roscoe et al., "Predicate Routing: Enabling Controlled Networking," ACM SIGCOMM Computer Communications Review, XP-001224681, vol. 33, No. 1, pp. 65-70, Jan. 2003.

EPO European Search Report for Application No./Patent No. 06007587.6-2416, Reference No. 114 663 a/lga, Applicant: Fujitsu Ltd., 4 pages, Aug. 1, 2006.

Chinese Government letter to Beijing Sanyou Intellectual Property Agency, Ltd., Examiner's First Notification of Office Action on Patent Application No. 200610072127.0, 12 pages, Oct. 17, 2008.

Chinese Government letter to Beijing Sanyou Intellectual Property Agency, Ltd., Examiner's First Notification of Office Action on Patent Application No. 200610072125.0, 10 pages, Oct. 10, 2008.

Pending U.S. Appl. No. 11/394,892, entitled "Purge Mechanism in Link Aggregation Group Managment," by Yukihiro Nakagawa et al., 32 pages plus 6 pages of drawings, filed Mar. 31, 2006.

Pending U.S. Appl. No. 11/394,960, entitled "Special Marker Message for Link Aggregation Marker Protocol," by Yukihiro Nakagawa et al., , 32 pages plus 6 pages of drawings, filed Mar. 31, 2006.

Pending U.S. Appl. No. 11/394,908, entitled "Distribution-Tuning Mechanism for Link Aggregation Group Management," by Yukihiro Nakagawa et al., , 32 pages plus 6 pages of drawings, filed Mar. 31, 2006.

Pending U.S. Appl. No. 11/278,751, entitled "Filtering Frames at an Input Port of a Switch," by Takeshi Shimizu, , 24 pages plus 3 pages of drawings, filed Apr. 5, 2006.

\* cited by examiner

| NETWORK ROUTING TABLE IN SWITCH Z.A | |
|---|---|
| SWITCH/DEVICE | OUTBOUND PORT |
| B | 1 |
| C | 2 |
| D | 2 |
| N | 4 |
| P | 5 |
| Q | 3 |
| MANAGEMENT DEVICE | 0 |

FIG. 2B

| GROUP ROUTING IN SWITCH Z.A | |
|---|---|
| GROUP | OUTBOUND PORT |
| X | 0 |
| Y | 1 |

NETWORK BASED ROUTING SCHEME

RELATED APPLICATION

This Application claims the benefit under 35 U.S.C. §119 (e) of U.S. Provisional Application Ser. No. 60/670,369 entitled "Link Aggregation and Network Management Techniques," filed on Apr. 12, 2005 and incorporated by reference herein.

TECHNICAL FIELD OF THE INVENTION

The present invention relates generally to network communications and, more particularly, to a network based routing scheme.

BACKGROUND OF THE INVENTION

Within networks switches route frames between different network elements. To route frames, switches often use Ethernet routing protocols, which enable switches to perform routing based on dynamic learning algorithms.

SUMMARY OF THE INVENTION

In accordance with the present invention, techniques for a network based routing scheme are provided. According to particular embodiments, these techniques describe a routing scheme and network organization that enable a private network to control the path frames take through the private network.

According to a particular embodiment, a method for routing frames comprises receiving frames using a group of ports of a switch. Each frame includes a source address, a destination address, and a payload. At least some portion of the frames also include one or more tags, where each tag specifies a group identification, a switch identification, and a port identification. The switch is part of a switch group, and the switch group is part of a switch network. The method also comprises maintaining routing information in the switch indicating an output port corresponding to each other switch in the switch group. For each frame, the method comprises operating in a first mode of operation if the frame conforms to a special routing protocol, and, otherwise, operating in a second mode of operation. In the first mode of operation, a first tag in the frame is read. Whether the first tag's switch identification corresponds to the switch is determined. If the switch identification does not correspond to the switch, the routing information is accessed to determine the output port corresponding to the switch identification, and the frame is transmitted on the determined one of the ports. If the switch identification corresponds to the switch, the frame is transmitted on the port corresponding to the first tag's port identification. In the second mode of operation, the frame is processed according to a standard routing protocol.

Embodiments of the invention provide various technical advantages. For example, these techniques may allow a device to specify a particular path that a frame should take though a private network. These private routing techniques can work in conjunction with widely used routing techniques, such as Ethernet routing. For example, within a private network, the switches can use private network routing protocols in place of Ethernet routing for selected network traffic. In particular embodiments, switches within a private network are divided into groups, and a specific port of a specific one of the switches can be uniquely referenced by a tag that indicates a group, a switch, and a port identifier. This can permit switches within a group to maintain private routing tables defined for only other switches in the group. In some embodiments, appropriate routing can be enabled with smaller routing tables that require less memory in a switch. Also, in particular embodiments, a tag can be added to a frame entering a private network to ensure that responses to the frame leave the private network on the exact same port.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is made to the following description taken in conjunction with the accompanying drawings in which.

DETAILED DESCRIPTION OF THE DRAWINGS

Figure 1:
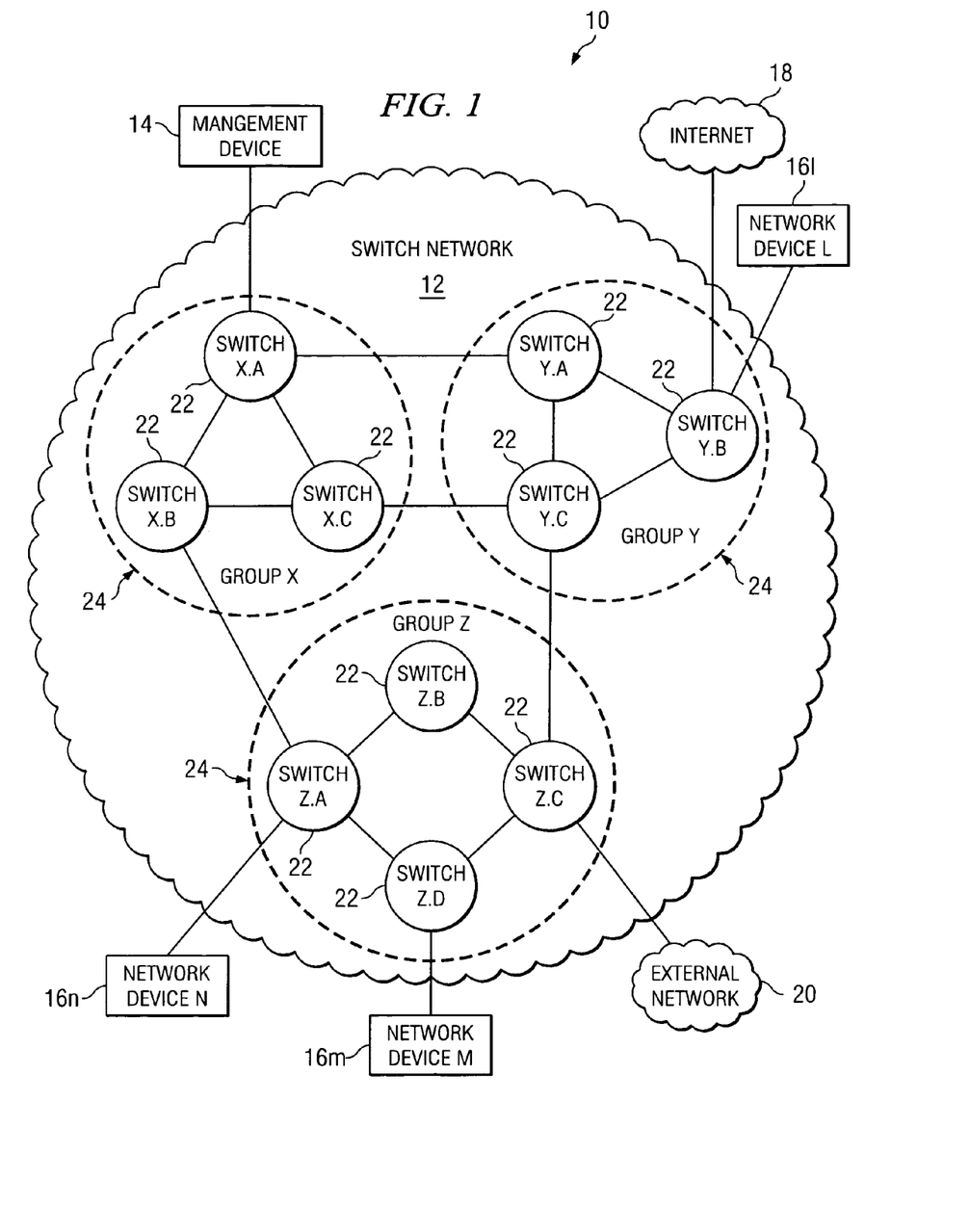
FIG. 1 illustrates a system that uses a network based routing scheme to control the path of frames through a switch network.

FIG. 1 illustrates a system, indicated generally at 10, that uses a network based routing scheme to control the path of frames through a switch network. As illustrated, system 10 includes a switch network 12, a management device 14, network devices 16, an internet 18, and an external network 20. The elements of system 10 may interconnect using any suitable techniques or protocols. In general, elements within system 10 interoperate to control the path frames take through switch network 12.

Switch network 12 includes switches 22 and represents any suitable collection of hardware, software, and controlling logic that interconnect switches 22 and elements coupled to switch network 12. Thus, switch network 12 provides an infrastructure to support communications between attached devices. As illustrated, switch network 12 includes switches 22 organized into groups 24. In some embodiments, switch network 12 is a private network that allows devices to specifically determine the path of a frame through the network.

Switches 22 represent networking devices that route frames within networks and/or between different networks. According to particular embodiments, each switch 22 represents a network device with multiple ports capable of switching network traffic among the ports. For example, switches 22 may each represent a chip-based switching device capable of switching frames among multiple ports based on standard Ethernet protocols. However, as used and described herein, switches 22 may include switches, routers, or any appropriate network devices capable of interconnecting network elements. Also, switches 22 may communicate using any suitable techniques or protocols for communication within switch network 12. In addition, as will be discussed in greater detail below, switches 22 implement a network based routing scheme to permit source routing of frames through switch network 12.

As illustrated, switches 22 are organized into groups 24. Switch network 12 may include one or more groups 24, and each group 24 may include one or more switches 22. Within one of groups 24, the constituent switches 22 may interconnect in any configuration using any suitable techniques or protocols. At the boundaries between groups 24, switches 22 from one group 24 may connect to switches 22 in another group 24. This provides for intra-group links and external links. As further illustrated, switches 22 also connect to management device 14, network devices 16, internet 18, external network 20. As should be understood from this illustration, switches 22 may connect to any suitable networks or devices. Switch network 12, as illustrated, includes three groups 24: group X, group Y, and group Z. Group X includes three switches 22: switch X.A, switch X.B, and switch X.C. Group Y also includes three switches 22: switch Y.A, switch Y.B, and switch Y.C. And group Z includes four switches 22: switch Z.A, switch Z.B, switch Z.C, and switch Z.D. This particular configuration is provided for illustrative purposes, and it should be understood that switch network 12 may encompass any suitable grouping of switches 22.

In some embodiments, each group 24 is assigned a unique identifier within switch network 12. In the illustrated embodiment, each group 24 has a unique identifier: X, Y, or Z. In particular embodiments, each switch 22 in a particular group 24 is assigned a unique identifier within the particular group 24. The identifier for a particular switch 22 in one group 24 may be shared by a different switch 22 in a different group 24. For example, switch X.A and switch Y.A share a common switch identifier, A, but are individually identifiable because they have a different group identifier, X and Y. Additionally, each switch 22 may have multiple ports. Accordingly, within switch network 12, a specific port may be uniquely referenced by use of a group/switch/port identifier. For example, X.A.5 uniquely refers to port 5 on switch A in group X. Additionally, within a particular group 24, a particular port may be uniquely referenced merely by use of a switch/port identifier. For example, within group X, A.5 may uniquely refer to port 5 on switch X.A.

Additionally, routing information within a particular group 24 may be defined for that particular group 24 only. In some embodiments, network routing information is stored in network routing tables. The network routing table for each constituent switch 22 in a particular group 24 may only provide routing information for other switches 22 in that particular group 24. In certain embodiments, network routing tables maintain routing information based on switch/port identifiers. This enables smaller table sizes and simpler look-up mechanisms, since switches 22 in one group 24 need not maintain routing information for switches 22 in other groups 24. Each switch 22 may further maintain basic routing information for other groups 24 in switch network 12. For example, each switch 22 in group X may maintain one routing table entry specifying a particular port for frames addressed for group Y. In particular embodiments, this enables appropriate routing without requiring lengthy routing tables While routing information is described as being stored in a tabular form, it is to be understood that routing information may be stored in any appropriate manner, including databases, files, hashes, etc. One embodiment of selected routing information stored by switches 22 is further explained below with reference to FIGS. 2A-C. Also, while not explicitly illustrated or described in detail, switches 22 may also maintain other routing information, such as Ethernet routing tables. Thus switches 22 may use a network based routing scheme for selected network traffic while using another routing scheme for other network traffic.

In operation, devices can control the path of frames through switch network 12 using tags in the frames. Frames may include header information indicating that the frame contains these tags. In some embodiments, two types of tags exist: inbound tags and outbound tags. Inbound tags may be used, for example, when a frame enters switch network 12 to ensure that responses to the frame are sent from switch network 12 on the same port that originally received the frame. When an inbound frame enters switch network 12 at a specific port, the receiving switch 22 may add an inbound tag indicating the group/switch/port that received the frame. In particular embodiments, switch 22 will add an inbound tag only to frames that switch 22 receives from outside switch network 12.

For example, in the illustrated embodiment, a frame destined for management device 14 may be received by switch Z.C from external network 20. Switch Z.C may add an inbound tag before forwarding the frame on the port indicated by routing information maintained by switch Z.C, possibly forwarding the frame to switch Y.C. Switch Y.C may forward the frame on the port indicated by its routing information and so on until the frame reaches its destination, management device 14. In other embodiments, each switch 22 receiving an inbound frame adds an inbound tag indicating the group/switch/port that received the frame. In particular embodiments, a receiving switch 22 adds an inbound tag that simply indicates the port on which the receiving switch 22 received the frame, and each subsequent switch 22 that receives the frame may add another inbound tag that indicates the port on which that switch 22 received the frame. In some embodiments, the path a frame has taken through switch network 12 can be known by an examination of the inbound tags in the frame and, in some cases, knowledge of the structure of the switch network 12.

Outbound tags may be used to determine the particular path a frame should take through switch network 12. For example, management device 14 and network devices 16 can transmit frames with outbound tags in order to define a desired frame path. In some embodiments, any device aware of the outbound tag protocols used by switch network 12 and its constituent switches 22 can transmit a frame with outbound tags. In order to use outbound tags, a transmitting device may add one or more tags to the header of the frame. Each outbound tag may enable switch network 12 to transport the frame along a set portion of switch network 12, such as over a link between two switches 22 or across one group 24.

In some embodiments, outbound tags are vector based. For vector based outbound tags, each outbound tag may specify a set of output ports. A sequence of these outbound tags in the frame can specify the path(s) of the frame, link by link through switch network 12. Each receiving switch 22 simply identifies the port(s) specified by the current outbound tag, removes the current outbound tag from the frame, and then forwards the frame on the specified port(s). For example, in the illustrated embodiment, switch X.A may receive a frame with vector based outbound tags. The first tag identifies port 4. In order to transmit the frame to the appropriate next switch 22, switch X.A removes the first tag and sends the frame on port 4. This frame would then be received by switch Y.A, and switch Y.A repeats a similar process in order to transmit the frame to the appropriate next switch 22. In one embodiment, each vector based tag is a bit map corresponding to the ports of switch 22. In another embodiment, vector based tags may reference memory locations, such as VLAN table entries, that indicate one or more outbound ports.

In other embodiments, outbound tags are port identification (port ID) based. For port ID based outbound tags, each outbound tag may specify a group/switch/port. A sequence of these outbound tags in the frame specifies the hop from one group 24 either to the next group 24, to an external network (such as internet 18 or external network 20), or to a device (such as management device 14 or network devices 16). With port ID based outbound tags, the "current" outbound tag may persist as the frame passes through a particular group 24 and may be removed when the frame is forwarded outside the particular group 24. For example, in the illustrated embodiment, switch Y.B may receive a frame ultimately destined for network device 16m, which is connected to switch Z.D. If the frame has port ID based outbound tags, switch Y.B determines the group/switch/port designated by the first tag in the frame. For this example, it may be port Y.C.2. Consider, for example, switch Y.B receiving a frame with an initial tag indicating port Y.C.2. Switch Y.B first evaluates whether the group identification specified by the tag matches the group in which switch Y.B is a member. If so, switch Y.B looks to the switch identification specified by the first tag to determine if the tag identifies switch Y.B (which in this instance, it does not). Because the switch identification specifies another switch in group Y, switch B accesses its routing information to determine the appropriate port on which to send a frame to switch Y.C. Then, switch Y.B forwards the frame on that port with the first tag still part of the frame. Upon receipt of this frame, switch Y.C checks the group identification and switch identification indicated by the tag. In this instance, since the group and switch identification in the tag specify switch Y.C, switch Y.C may remove the first tag from the frame and forward the frame on the port designated by the tag—port 2 in this example.

While switch network 12 is depicted as a plurality of switches 22 organized into established groups 24, it should be noted that this is a logical depiction. The components of switch network 12 may be located at one or more physical locations and/or may include additional or fewer components. Also, the functionality of switches 22 and groups 24 may be provided by any suitable collection and arrangement of components. The functions performed by the various components of switch network 12 may be accomplished by any suitable devices to control the path of frames through a network.

As illustrated, system 10 also includes management device 14 connected to switch network 12 through switch X.A. Management device 14 may control the operation of switch network 12 and/or the interoperation between different switches 22 within switch network 12. In particular embodiments, management device 14 performs an initial configuration of switch network 12. The initial configuration separates switches 22 into groups 24, assigns a switch identification to each switch 22, assigns a group identification to each group 24, and distributes to each switch 22 the switch identification and the group identification corresponding to that particular switch 22. Also, management device 14 may send the initial configuration results to any other devices that may use the network based routing scheme. Management device 14 may perform the initial configuration in any appropriate manner, including either an automated or a manual method.

In some embodiments, management device 14 receives network management messages from network devices 16, internet 18, external network 20, and/or switches 22. To control routing of management messages to management device 14, switches 22 within switch network 12 may provide for special handling of received management messages. For example, when a particular switch 22 detects a received network management message, switch 22 may access its routing information to determine a port on which to forward the network management message. In particular embodiments, each switch 22 has an defined port on which network management messages should be sent. The defined port may vary from switch 22 to switch 22. However, a network management message received by switch Z.C, for example, may always travel through the same switches 22 along the same path to reach management device 14. In certain embodiments, one or more of switches 22 add inbound tags to network management messages so that management device 14 knows the port the network management message entered switch network 12 and/or the precise route that each network management message took to reach the management device 14.

In addition, as noted above, system 10 may include any suitable number of management devices 14. In these instances, switches 22 may send management messages to some or all management devices 14. For example, different management devices 14 may have responsibility for different management functions, and switches 22 may forward management messages based on type or other suitable factors.

Network devices 16 represent any device connectable to switch network 12. For example, network devices 16 may include personal computers, servers, file storage, network printers, and other network enabled devices. Network devices 16 communicate with other network devices 16, management device 14, internet 18, and external network 20 through switch network 12. Although not illustrated, network devices 16 can also be connected to other networks or other devices, components, or elements. As illustrated, system 10 includes three network devices: 16l, 16m, and 16n. Network device 16l connects to switch network 12 through switch Y.B; network device 16m connects to switch network 12 through switch Z.D; and network device 16n connects to switch network 12 through switch Z.A. While system 10 includes three network devices 16, it is understood that any number and type of network devices 16 may be connected to switch network 12.

Internet 18 and external network 20 represent networks connected to switch network 12 through which messages may be sent and/or received from other elements connected to switch network 12. Internet 18 may be any group of networks connected together, such as a world wide collection of computers and computer networks that can use TCP/IP network protocols to facilitate data transmission and exchange. External network 20 represents another network of devices capable of facilitating communication between devices. For example, external network 20 may include one or more networks such as a telecommunications network, a satellite network, a cable network, local area networks (LANs), wide area networks (WANs), public switched telephone networks, and/or any other appropriate networks. While not expressly illustrated, external network 20 may separately employ a network based routing scheme, similar to that described for switching network 12, for communications within external network 20.

In the illustrated embodiment, internet 18 connects to switch network 12 through switch Y.B, and external network 20 connects to switch network 12 through switch Z.C. Internet 18 and external network 20 can communicate with network devices 16, management device 18, and each other through switch network 12. Although not illustrated, it is understood that internet 18 and external network 20 can each also be connected to other networks or other devices, components, or elements. While system 10 includes two networks, internet 18 and external network 20, any number and types of networks 16 may be connected to switch network 12.

Particular embodiments of system using a network based routing scheme have been described and are not intended to be all-inclusive. While system 10 is depicted as containing a certain configuration and arrangement of elements, it should be noted that this is a logical depiction, and the components and functionality of system 10 may be combined, separated and distributed as appropriate both logically and physically. Also, the functionality of system 10 may be provided by any suitable collection and arrangement of components. The described and illustrated organization, number, and structure of switches 22 in switch network 12 is merely illustrative. Switches 22 may be organized and structured in any suitable manner and may include any suitable number or type of devices, and switch network 12 may include any appropriate configuration and number of groups 24. System 10 may be structured in any suitable manner to control the path of frames through switch network 12.

Figure 2A:
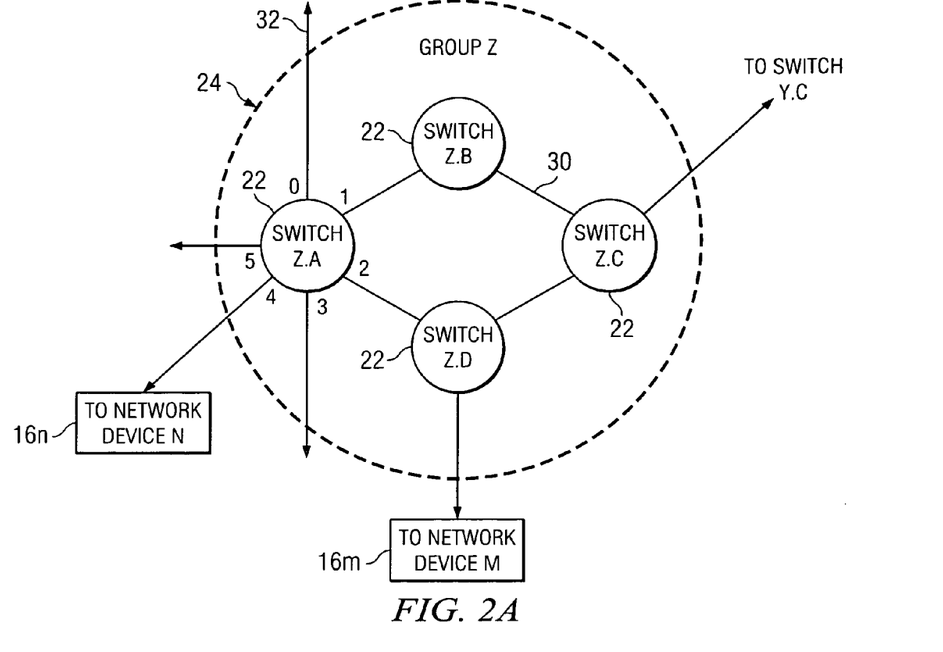
FIGS. 2A-C illustrate a group of switches from the switch network that employ a network based routing scheme and tables storing routing information maintained by one of the switches.
Figure 2B:
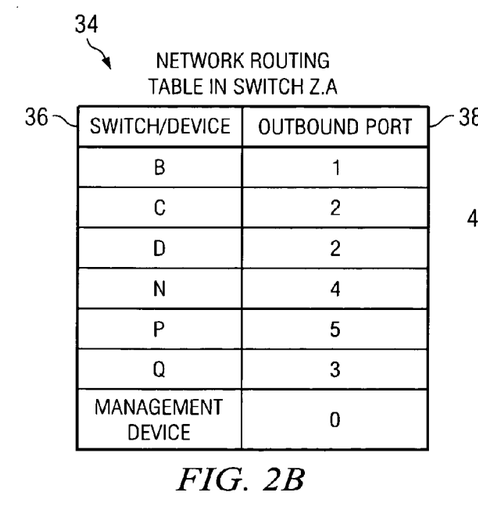
Figure 2C:
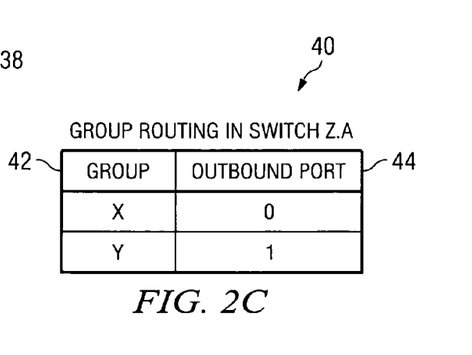

FIGS. 2A-C illustrate one of groups 24, group Z, employing a network based routing scheme and sample network routing tables corresponding to switch Z.A in group Z. FIG. 2A illustrates an embodiment of one of groups 24, group Z, and its constituent switches 22: switch Z.A, switch Z.B, switch Z.C, and switch Z.D. The constituent switches 22 are connected by intra-group links 30 and external links 32. Intra-group links 30 connect constituent switches 22 to other constituent switches 22, and external links 32 connect constituent switches 22 to switches 22 in other groups 24 and network devices 16$m,n$. Although not illustrated, external links 32 can connect constituent switches 22 to a variety of networks, components, elements, or devices, including, for example, other network devices 16, management device 14, internet 18, and external network 20.

As illustrated, switch Z.A has six intra-group links 30 and external links 32, designated by ports 0 through 5. In the illustrated embodiment, port 0 is connected to switch X.B; port 1 is connected to switch Z.B; port 2 is connected to switch Z.D; and port 4 is connected to network device 16$n$. These connections between switch Z.A. and other devices or networks can be accomplished by any suitable logic or devices employing any suitable communications or protocols. While not illustrated, ports 3 and 5 may be connected any network devices 16, switches 22, networks, for example internet 18 or external network 20, or any other networks, components, elements, or devices. While depicted has having only six ports, it is understood that switches 22 can include any suitable number of ports.

FIG. 2B illustrates one example of how routing information can be stored by switches 22. In the illustrated embodiment, switch Z.A stores routing information as a network routing table 34. Network routing table 34 includes a switch column 36 indicating a switch or device that should receive a frame, and an outbound port column 38 showing the corresponding outbound port on which a frame should be sent. When switch Z.A receives a frame destined for an identified switch 22 or device, such as network devices 16$m,n$ or management device 14, it references table 34 to determine on which port the frame should be sent.

In particular embodiments, the division of switch network 12 into groups 24 of switches 22 allows any specific port in switch network 12 to be uniquely referenced by use of a group/switch/port identifier. Additionally, within a group 24, a particular port may be uniquely referenced merely by the use of a switch/port identifier. Accordingly, within a particular group 24, such as group Z, network routing tables may be defined only for the group. As illustrated, network routing table 34 for switch Z.A only provides routing information for other switches 22 in group Z, devices connected to switch Z.A, and management device 14. As switch Z.A need not maintain routing information for switches 22 in groups 24 other than group Z, switch Z.A may have a smaller network routing table size and simpler look-up mechanisms. In certain embodiments, routing information is stored in tabular form, while in other embodiments, routing information is stored and/or maintained in a variety of different ways. Routing information is illustrated and described as being stored in table 34, but it is to be understood that this is merely for illustrative purposes and routing information may be stored in any suitable manner. Moreover, while not expressly illustrated, switches 22 may further include routing information to facilitate routing of frames using other protocols. For example, switches 22 may maintain Ethernet-based routing information for routing frames based on addressing information, that may include source and destination addresses for a frame.

For example, switch Z.A may receive a frame with port ID based outbound tags. Switch Z.A looks at the first tag and determines whether the tag's group identification is equal to group Z. If so, switch Z.A determines whether the tag's switch identification is equal to switch Z.A. If the tag's switch identification is the same as the switch identification for switch Z.A, then switch Z.A strips the first tag from the frame and forwards the frame on the port identified by the tag. Otherwise, switch Z.A knows that the switch identified by the tag's switch identification should receive this frame. By reference to network routing table 34, switch Z.A can determine the appropriate outbound port for the frame so that it reaches the switch identified by the tag.

As another example, switch Z.A may receive a network management message destined for management device 14. After accessing table 34, switch Z.A determines that frames destined for management device 14 should be forwarded on port 0. In the illustrated embodiment, switch X.B receives the network management message from switch Z.A and similarly forwards it based on its routing information. In particular embodiments, routing information stored in switches 22 identifies a specific outbound port on which any and all network management messages are to be forwarded. In certain embodiments, routing information indicates an outbound port for forwarding of network management messages to management device 14 by more complicated methods.

FIG. 2C illustrates an example of group routing information that may be stored and maintained by switch Z.A. As illustrated, switch network 12 includes group Z, group Y, and group X. In many embodiments, switch Z.A does not maintain routing information for switches 22 located in group Y or group X. Accordingly, in particular embodiments, switch Z.A maintains a table 40 providing routing information for group Y, as a whole, and group X, as a whole. The basic routing information for each group 24, listed by column 42, is correlated to an outbound port, listed by column 44. Thus, switch Z.A may maintain table 40 to specify a particular outbound port for frames addressed for group X: port 0 in the illustrated embodiment. In particular embodiments, the basic routing information for other groups 24 is stored in a variety of different formats, and the use of table 40 is intended to be illustrative and not limiting. While illustrated as having only two groups 24 stored, table 40 may include routing information corresponding to any number of different groups 24, devices, networks, etc. In some embodiments, switches 22 do not store group routing information.

Group Z and tables 34 and 40, which are illustrated and described with respect to FIGS. 2A-C, are merely illustrative.

Figure 3A:
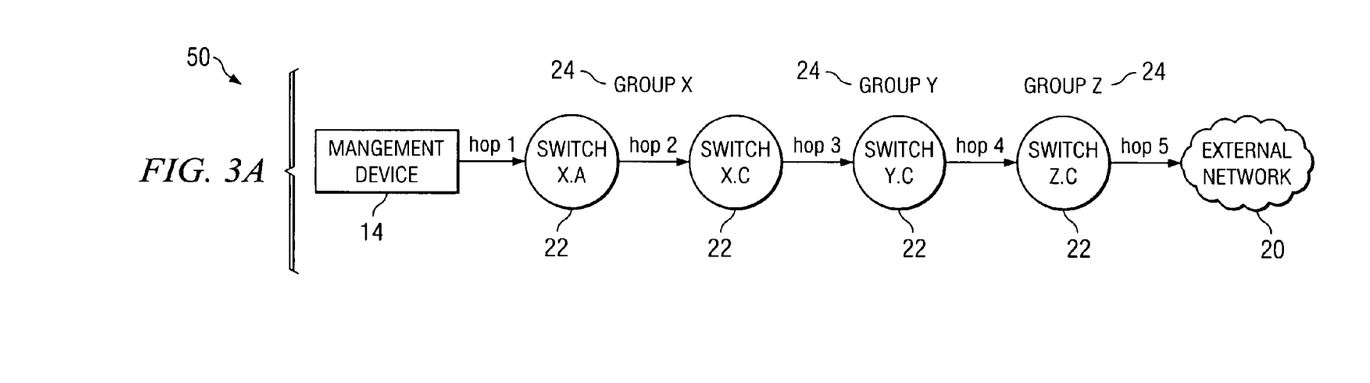
FIGS. 3A-C illustrate a path of an outbound frame and the corresponding structure of the frame as it passes through various switches in the switch network.
Figure 3B:
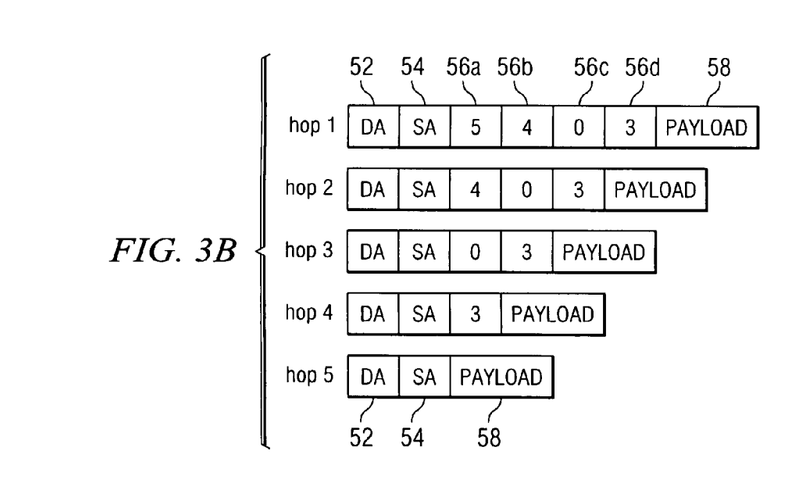
Figure 3C:
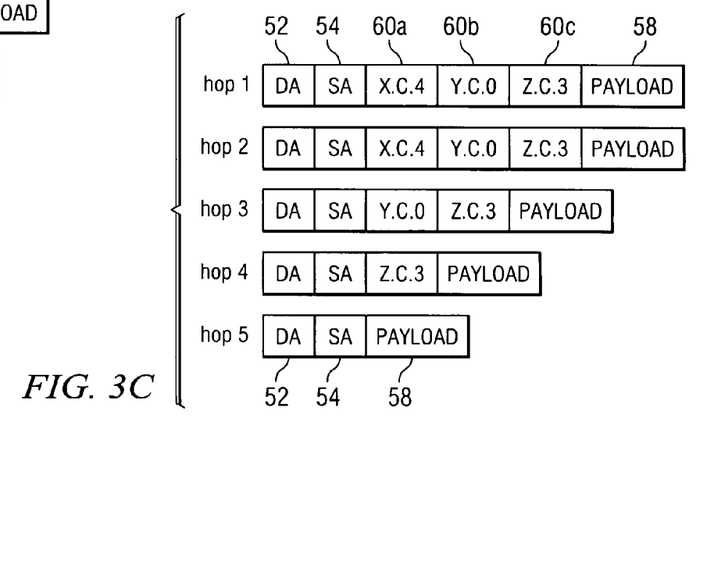

It is understood that the manner of operation and devices indicated as performing different operations may be modified in any appropriate manner. While routing information is depicted in a tabular form, certain embodiments include routing information stored in any suitable manner. Additionally, while group Z is depicted as having a particular configuration and arrangement of components, it is intended that groups 24 include any suitable devices appropriately arranged to provide for a system that controls the paths of frames through a network FIGS. 3A-C illustrate a path of an outbound frame and the corresponding structure of the frame as it passes through various switches 22. FIG. 3A illustrates the path 50 of a frame. In the illustrated embodiment, a frame is sent by management device 14 through four switches 22 that are constituents of three different groups 24 and arrives at external network 20. Management device 14 may structure a frame so that various switches 22 in switch network 12 know which particular direction to route the frame. Management device 14 may do this so that the most efficient route is taken, the route with the least traffic is used, a faulty switch 22 is avoided, or for any suitable reason. Management device 14 may send the frame as a response to a frame sent by external network 20. The route selected by management device 14 may be selected so that external network 20 receives the frame at the same port from which the original message was sent.

As illustrated, path 50 includes five different hops (1-5). First, management device 14 sends the frame to switch X.A through hop 1. Then, switch X.A sends the frame to switch X.C in hop 2; switch X.C sends the frame to switch Y.C in hop 3; and switch Y.C sends the frame to switch Z.C in hop 4. Finally, switch Z.C sends the frame to external network 20 in hop 5. In some embodiments, the frame is structured to include vector based tags. The structure of a frame with vector based tags is shown in FIG. 3B for each hop (1-5) of path 50. In particular embodiments, the frame is structured to include port ID based tags. The structure of a frame with port ID based tags is shown in FIG. 3C for each hop (1-5) of path 50.

FIG. 3B shows the corresponding structure of a frame through the various hops (1-5) of path 50. In the illustrated embodiment, the frame is structured with a vector based tag indicating the next switch 22 in path 50. As illustrated, a frame includes a destination address 52, a source address 54, one or more (or no) tags 56, and a payload 58. Destination address 52 may be a representation in any appropriate format or protocol of the destination of the frame. Source address 54, similarly, may be a representation in any appropriate format or protocol of the source of the frame. Tags 56 operate control the path of frames through switch network 12. Payload 58 represents any type of information and may include all information not contained in the header of the frame. In some embodiments, payload 58 is simply the information to be transmitted by the frame. In other embodiments, payload 58 represents any information not processed or analyzed by switches 22.

The frame corresponding to hop 1 represents the structure of the frame sent from management device 14 to switch X.A. During hop 1, the frame contains destination address 52, source address 54, four tags 56, and payload 58. Switch X.A receives the frame and extracts tag 56*a*. Because tag 56*a* contains the value 5, switch X.A sends the frame on port 5 after removing tag 56*a* from the frame. So, during hop 2, the frame contains destination address 52, source address 54, three tags 56, and payload 58. After hop 2, switch X.C receives the frame and extracts tag 56*b*. As illustrated, tag 56*b* contains the value 4. Switch X.C removes tag 56*b* from the frame and sends the frame out port 4. During hop 3, the frame contains destination address 52, source address 54, two tags 56, and payload 58. Switch Y.C receives the frame and extracts tag 56*c*. Tag 56*c* contains the value 0, so switch Y.C sends the frame on port 0 after removing tag 56*c* from the frame. For hop 4, the frame contains destination address 52, source address 54, one tag 56, and payload 58. Switch Z.C receives the frame and extracts the last tag 56: tag 56*d*. Tag 56*d* contains the value 3. Switch Z.C removes tag 56*d* from the frame and sends the frame out port 3, after which it is received by external network 20.

The frame structure in FIG. 3B depicts the logical information contained in a number of vector based tags merely for illustrative purposes. However, as discussed above, the vector based tags may include information encoded using any suitable format to permit switches 22 to appropriately identify one or more outbound ports. As noted above, each vector based tag may include a bit vector, a reference to a bit vector stored in memory, or any other data structure suitable to indicate one or more outbound ports.

FIG. 3C shows the corresponding structure of a frame through the various hops (1-5) of path 50. In the illustrated embodiment, the frame is structured with a port ID based tag indicating the next group 24 in path 50. As illustrated, a frame includes destination address 52, source address 54, one or more (or no) tags 60, and payload 58. In some embodiments, destination address 52, source address 54, and payload 58 are similar to those represented in FIG. 3B. Tags 60 operate control the path of frames through switch network 12.

The frame corresponding to hop 1 represents the structure of the frame sent from management device 14 to switch X.A. During hop 1, the frame contains destination address 52, source address 54, three tags 60, and payload 58. Switch X.A receives the frame and extracts tag 60*a*. Tag 60*a* specifies port X.C.4: port 4 of switch X.C. Switch X.A first compares the group identification of tag 60*a*, "X," to its group identification. Finding there is a match, switch X.A then compares the switch identification of tag 60*a*, "C," to its switch identification. Because there is no match, switch X.A looks to its routing information to determine the appropriate outbound port for a frame destined for switch X.C. Switch X.A identifies port 5 as the correct port and sends the frame on port 5 towards switch X.C. In the illustrated embodiment, switch X.A does not remove tag 60*a* from the frame because there was no match of the switch identification in tag 60*a* and the switch identification of switch X.A.

During hop 2, the frame still contains destination address 52, source address 54, three tags 60, and payload 58. Switch X.C receives the frame and extracts tag 60*a*. Switch X.C first compares the group identification of tag 60*a*, "X," to its group identification. Finding there is a match, switch X.C then compares the switch identification of tag 60*a*, "C," to its switch identification. Because there is a match, switch X.C evaluates the port identification, which is 4. Switch X.C first removes tag 60*a*, and then sends the frame on port 4 towards switch Y.C.

For hop 3, the frame contains destination address 52, source address 54, two tags 60, and payload 58. Switch Y.C receives the frame and extracts tag 60*b*. Switch Y.C, similarly, first compares the group identification of tag 60*a*, "Y," to its group identification. Finding there is a match, switch Y.C then compares the switch identification of tag 60*b*, "C," to its switch identification. Because there is a match, switch Y.C evaluates the port identification, which indicates port 0. Switch Y.C removes tag 60*b* and sends the frame on port 0.

Accordingly, the frame contains destination address 52, source address 54, one tag 60*c*, and payload 58 during hop 4. Switch Z.C receives the frame and extracts tag 60*c*. First, switch Z.C compares the group identification of tag 60*a*, "Z," to its group identification. Finding a match, switch Z.C compares the switch identification of tag 60*c*, "C," to its switch identification. Because there is another match, switch Y.C evaluates the port identification, port 3. Switch Z.C removes tag 60*c* and sends the frame on port 3. The frame, during hop 5 contains destination address 52, source address 54, and payload 58. After hop 5, the frame is received by external network 20.

Figure 4:
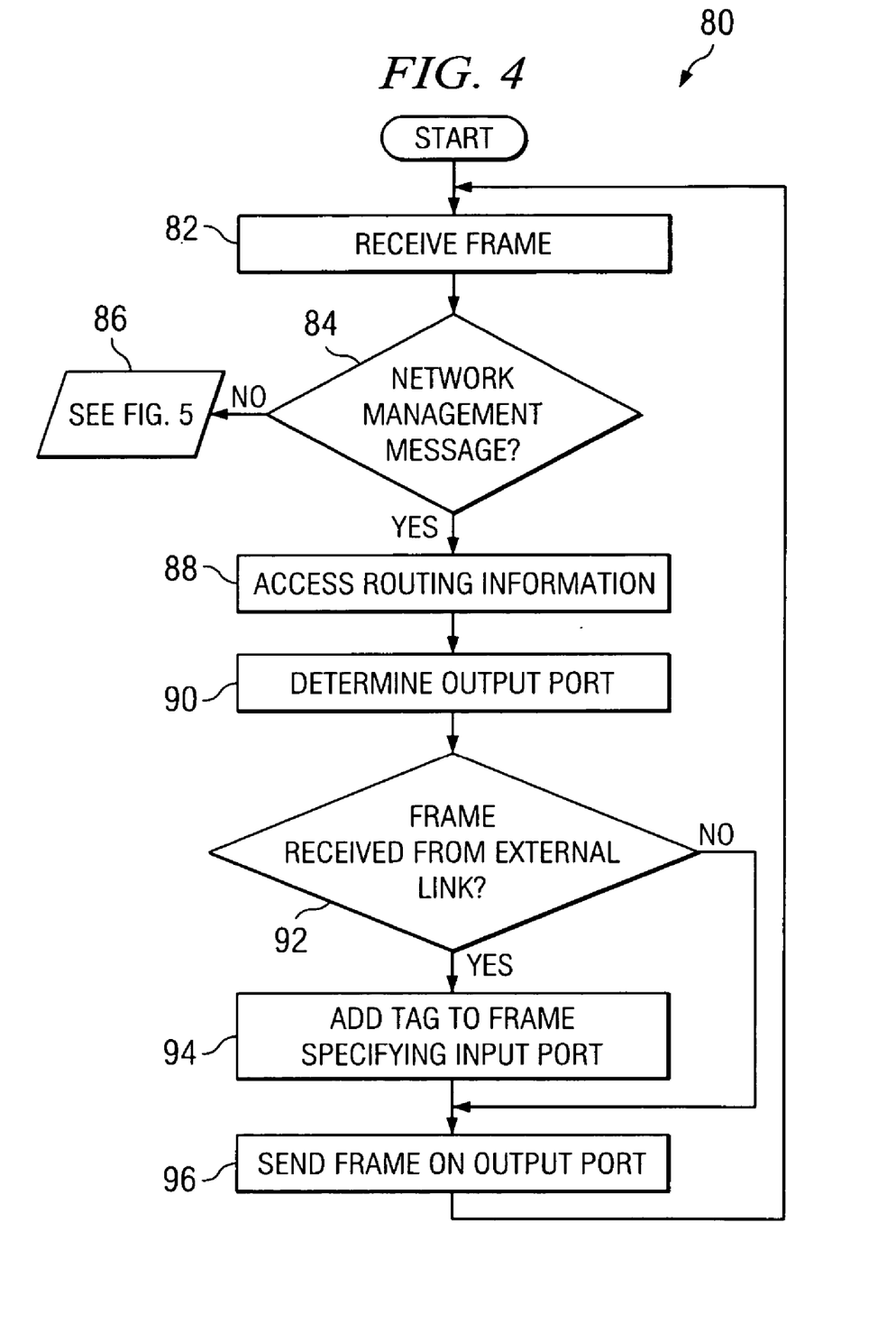
FIG. 4 is a flowchart illustrating a method of processing a network management message received at a switch in the switch network.

The devices and frame configurations illustrated and described with respect to FIGS. 3A-C are merely illustrative. It is understood that the manner of operation and devices indicated as performing different operations may be modified in any appropriate manner. While frames are depicted as incorporating a particular protocol and structure, the frames in certain embodiments are structured in any suitable manner and utilize any protocols. Specifically, while frames are shown with destination address 52, source address 54, and payload 58, certain embodiments contemplate any frame structure accompanying tags that control the path of frames through switch network 12. Additionally, while the path taken by a frame depicted as having a particular set of switches 22, it is intended that this path include any suitable devices appropriately arranged to provide for a system that controls the paths of frames through a network FIG. 4 is a flowchart illustrating a method 80 of processing a network management message received at one of switches 22. In the illustrated embodiment, port ID based tags are added to inbound network management messages so that management device 14 can determine the precise entry point of the network management messages that management device 14 receives.

Switch 22 receives a frame at step 82. Switch 22 determines whether the frame is a network management message in step 84. Network management messages may be identified, for example, by information contained in the header of the frame, by the frame being received at a particular time, by the frame being received from a particular location, or in any other appropriate manner. If the frame is not a network management message, a method similar to that shown in FIG. 5 may be followed, shown as step 86. However, if the frame is a network management message, method 80 continues to step 88, where switch 22 accesses routing information stored on switch 22. Using the routing information, switch 22 determines the appropriate output port for the network management message in step 90. In some embodiments, switch 22 accesses the routing information, which identifies the appropriate output port for any and all network message. For example, the routing information may be similar to that illustrated and described with respect to FIG. 2B. In other embodiments, switch 22 uses the routing information to calculate the appropriate output port for the network management message.

After calculating the output port for the network management message, switch 22 determines whether switch 22 received the frame from an external link in step 92. If so, switch 22 adds a tag to the frame specifying the input port on which switch 22 received the frame at step 94. If the frame was not received from an external link, method 80 simply proceeds to step 96. Finally, in step 96, switch 22 sends the frame on the output port that was identified in step 90. Then, method 80 returns to step 82, where switch 22 receives another frame.

The method described with respect to FIG. 4 is merely illustrative, and it is understood that the manner of operation and devices indicated as performing the operations may be modified in any appropriate manner. For example, in some embodiments, port ID based tags are added to inbound network management messages. While the method describes particular steps performed in a specific order, it should be understood that system 10 contemplates any suitable collection and arrangement of elements performing some, all, or none of these steps in any operable order.

Figure 5:
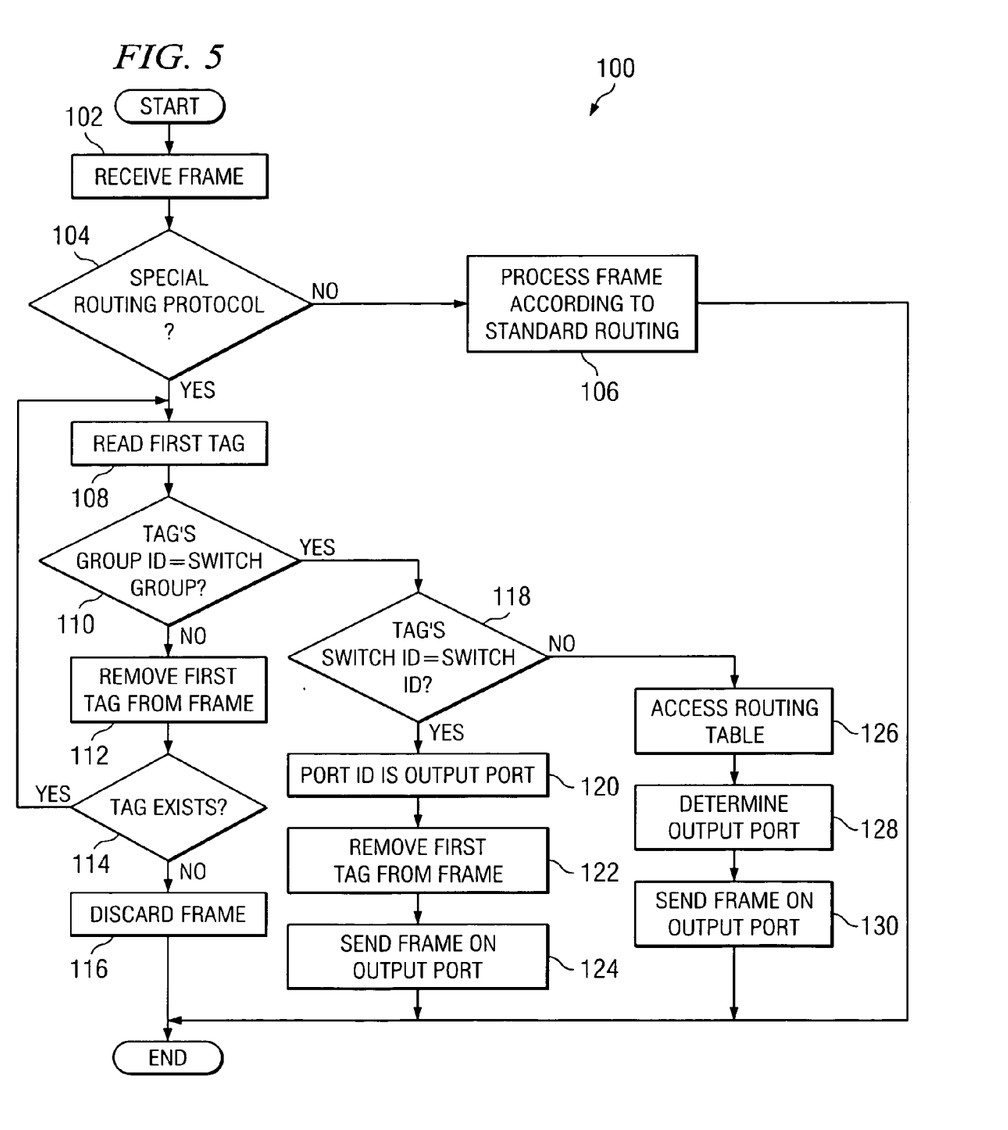
FIG. 5 is a flowchart illustrating a method of processing a frame received at a switch in the switch network.

FIG. 5 is a flowchart illustrating a method 100 of processing a frame received at switch 22. In the illustrated embodiment, port ID based tags are used to control the path of frames through switch network 12. Switch 22 receives a frame at step 102. Then, in step 104, switch 22 determines whether or not the frame is in the format of the special routing protocol. In some embodiments, a virtual local area network identification tag at the beginning of the frame contains a particular value indicating that the special routing protocol can be used. In other embodiments, switch 22 determines that the frame uses or conforms to the special routing protocol in a variety of different ways. If the special routing protocol should not be applied to the frame, switch 22 processes the frame according to standard routing in step 106, and then method 100 is complete. In some embodiments, standard routing includes ethernet and/or internet protocol (IP) based routing, although switches 22 can use any appropriate routing protocols.

If the special routing protocol should be used, method 100 proceeds to step 108, where switch 22 extracts (or reads) the first tag in the frame. In some embodiments, the first tag is the tag found nearest the beginning of the frame. In other embodiments, the first tag is merely the first of the frame's tags that switches 22 process. In step 110, switch 22 determines whether the group identification found in the tag is the group to which that particular switch 22 belongs. If the group identification and the group of switch 22 do not match, then switch 22 removes that first tag from the frame at step 112. In step 114, switch 22 evaluates whether the frame still has any tags. If so, method 100 returns to step 108, where switch 22 reads the first tag in the frame. Otherwise, switch 22 discards the frame in step 116, and, then, method 100 ends.

If switch 22 determined that the tag's group identification is equal to the group identification of switch 22, method 100 proceeds to step 118. In step 118, switch 22 determines whether the tag's switch identification is equal to the switch identification of switch 22. If so, switch 22 determines that the appropriate output port for the frame is equal to the port identification in the tag at step 120. Switch 22 removes the first tag from the frame in step 122 and sends the frame on the determined output port in step 124; then, method 100 ends. If the tag's switch identification is not equal to the switch identification of switch 22, method 100 proceeds from step 118 to step 126. In step 126, switch 22 accesses routing information stored by switch 22. In some embodiments, switch 22 stores routing information in a tabular form. Switch 22 determines, from the routing information, on which port the frame should be forwarded so that the frame is received by the particular switch 22 identified by the switch identification in the frame, step 128. Switch 22 sends the frame on that output port, step 130, and method 100 ends.

The method described with respect to FIG. 5 is merely illustrative, and it is understood that the manner of operation and devices indicated as performing the operations may be modified in any appropriate manner. While the method describes particular steps performed in a specific order, it should be understood that system 10 contemplates any suitable collection and arrangement of elements performing some, all, or none of these steps in any operable order.

Although the present invention has been described in several embodiments, a myriad of changes and modifications may be suggested to one skilled in the art, and it is intended that the present invention encompass such changes and modifications as fall within the present appended claims.

What is claimed is:

1. A method for routing frames comprising:
receiving frames using a plurality of ports of a switch, each of the frames including a source address, a destination address, and a payload, at least some portion of the frames including one or more tags, each of the tags specifying a group identification, a switch identification, and a port identification, wherein the switch is part of a switch group and the switch group is part of a switch network;
maintaining routing information in the switch indicating an output one of the ports for each other switch in the switch group;
for each of the frames, operating in a first mode of operation if the frame conforms to a special routing protocol, and, if the frame does not conform, operating in a second mode of operation;
in the first mode of operation:
reading a first of the tags in the frame;
determining whether the switch identification of the first of the tags corresponds to the switch;
if the switch identification does not correspond to the switch, accessing the routing information to determine the output one of the ports corresponding to the switch identification and transmitting the frame on the determined output one of the ports; and
if the switch identification corresponds to the switch, transmitting the frame on the one of the ports corresponding to the port identification of the first of the tags; and
in the second mode of operation, processing the frame according to a standard routing protocol.

2. The method of claim 1, further comprising, in the first mode of operation:
determining whether the group identification of the first of the tags corresponds to the switch group; and
if the group identification does not correspond to the switch group, removing the first of the tags from the frame;
wherein the determination of whether the switch identification corresponds to the switch is made after the determination of whether the group identification corresponds to the switch group.

3. The method of claim 2, further comprising:
determining whether the frame includes a second tag after the removing of the first of the tags from the frame;
if the frame includes the second tag, reading the second tag and determining whether the group identification of the second tag corresponds to the switch group; and
if the frame does not include the second tag, dropping the frame.

4. The method of claim 1, further comprising:
receiving a network management message at one of the input ports;
determining one of the ports on which to transmit the received network management message;
if the network management message is received on a link connecting the switch to a device external to the switch network, inserting a tag in the network management message indicating the one of the ports of the switch that received the network management message; and
transmitting the frame on the determined one of the ports.

5. The method of claim 4, wherein the routing information includes a single entry specifying the one of the ports on which to transmit all network management messages received by the switch.

6. The method of claim 1, further comprising, in the first mode of operation, removing the first of the tags from the frame before transmitting the frame if the switch identification of the first of the tags corresponds to the switch.

7. The method of claim 1, wherein:
each switch group in the switch network has a group identifier, the group identifier corresponding to each switch group is not equal to the group identifier corresponding to any other switch group; and
for each switch group, each switch in the switch group has a corresponding switch identifier, the switch identifier corresponding to each switch is not equal to the switch identifier corresponding to any other switch in the switch group.

8. A method for routing frames comprising:
receiving a frame at one of a plurality of ports of a switch, the frame including a source address, a destination address, and a payload;
determining whether the frame conforms to a special routing protocol;
if the frame conforms to the special routing protocol, operating in a first mode of operation, and, if the frame does not conform, operating in a second mode of operation;
in the first mode of operation:
reading a first of one or more tags, each tag specifying a port identification;
determining an output one of the ports corresponding to the port identification of the first of the tags;
removing the first of the tags from the frame; and
transmitting the frame on the output one of the ports; and
in the second mode of operation, processing the frame according to standard routing protocols.

9. A switch comprising:
a plurality of ports, each of the ports operable to receive frames, each of the frames including a source address, a destination address, and a payload, at least some portion of the frames including one or more tags, each of the tags specifying a group identification, a switch identification, and a port identification;
a memory operable to maintain network routing information and standard routing information, the network routing information indicating an output one of the ports for one or more other switches in a switch group, the standard routing information mapping addressing information to the output one of the ports, wherein the switch is part of the switch group and the switch group is part of a switch network;
wherein, for each of the frames, the switch is operable to determine whether the frame conforms to a special routing protocol and to process the frame using the standard routing information if the frame does not conform to the special routing protocol; wherein the switch is further operable, if the frame conforms to the special routing protocol, to read a first of the tags in the frame and to determine whether the switch identification of the first of the tags corresponds to the switch; the switch further operable, if the switch identification does not correspond to the switch, to access the network routing information to determine the output one of the ports corresponding to the switch identification and to transmit the frame on the determined output one of the ports; the switch further operable, if the switch identification corresponds to the switch, to transmit the frame on the one of the ports corresponding to the port identification of the first of the tags.

10. The switch of claim 9, wherein:
the switch is further operable to determine whether the group identification of the first of the tags corresponds to the switch group, and, if the group identification does not correspond to the switch group, remove the first of the tags from the frame; and
the determination of whether the switch identification corresponds to the switch is made after the determination of whether the group identification corresponds to the switch group.

11. The switch of claim 10, wherein the switch is further operable to:
determine whether the frame includes a second tag after the removing of the first of the tags from the frame;
if the frame includes the second tag, read the second tag and determining whether the group identification of the second tag corresponds to the switch group; and
if the frame does not include the second tag, drop the frame.

12. The switch of claim 9, wherein the switch is further operable to:
receive a network management message at one of the input ports;
determine one of the ports on which to transmit the received network management message;
if the network management message is received on a link connecting the switch to a device external to the switch network, insert a tag in the network management message indicating the one of the ports of the switch that received the network management message; and
transmit the frame on the determined one of the ports.

13. The switch of claim 12, wherein the network routing information includes a single entry specifying the one of the ports on which to transmit all network management messages received by the switch.

14. The switch of claim 9, wherein the switch is further operable to, if the switch identification of the first of the tags corresponds to the switch, remove the first of the tags from the frame before transmitting the frame.

15. The switch of claim 9, wherein:
each switch group in the switch network has a group identifier, the group identifier corresponding to each switch group is not equal to the group identifier corresponding to any other switch group; and
for each switch group, each switch in the switch group has a corresponding switch identifier, the switch identifier corresponding to each switch is not equal to the switch identifier corresponding to any other switch in the switch group.

16. Logic for routing frames, the logic encoded in media and operable when executed to:
receive frames using a plurality of ports of a switch, each of the frames including a source address, a destination address, and a payload, at least some portion of the frames including one or more tags, each of the tags specifying a group identification, a switch identification, and a port identification, wherein the switch is part of a switch group and the switch group is part of a switch network;
maintain routing information in the switch indicating an output one of the ports for each other switch in the switch group;
for each of the frames, operate in a first mode of operation if the frame conforms to a special routing protocol, and, if the frame does not conform, operate in a second mode of operation;
in the first mode of operation:
read a first of the tags in the frame;
determine whether the switch identification of the first of the tags corresponds to the switch;
if the switch identification does not correspond to the switch, access the routing information to determine the output one of the ports corresponding to the switch identification and transmit the frame on the determined output one of the ports; and
if the switch identification corresponds to the switch, transmit the frame on the one of the ports corresponding to the port identification of the first of the tags; and
in the second mode of operation, process the frame according to a standard routing protocol.

17. The logic of claim 16, further operable to, in the first mode of operation:
determine whether the group identification of the first of the tags corresponds to the switch group; and
if the group identification does not correspond to the switch group, remove the first of the tags from the frame;
wherein the determination of whether the switch identification corresponds to the switch is made after the determination of whether the group identification corresponds to the switch group.

18. The logic of claim 17, further operable to:
determine whether the frame includes a second tag after the removing of the first of the tags from the frame;
if the frame includes the second tag, read the second tag and determine whether the group identification of the second tag corresponds to the switch group; and
if the frame does not include the second tag, drop the frame.

19. The logic of claim 16, further operable to:
receive a network management message at one of the input ports;
determine one of the ports on which to transmit the received network management message;
if the network management message is received on a link connecting the switch to a device external to the switch network, insert a tag in the network management message indicating the one of the ports of the switch that received the network management message; and
transmit the frame on the determined one of the ports.

20. The logic of claim 19, wherein the routing information includes a single entry specifying the one of the ports on which to transmit all network management messages received by the switch.

21. The logic of claim 16, further operable to, in the first mode of operation, remove the first of the tags from the frame before transmitting the frame if the switch identification of the first of the tags corresponds to the switch.

22. The logic of claim 16, wherein:
each switch group in the switch network has a group identifier, the group identifier corresponding to each switch group is not equal to the group identifier corresponding to any other switch group; and
for each switch group, each switch in the switch group has a corresponding switch identifier, the switch identifier corresponding to each switch is not equal to the switch identifier corresponding to any other switch in the switch group.

23. A system for routing frames comprising:
means for receiving frames using a plurality of ports of a switch, each of the frames including a source address, a destination address, and a payload, at least some portion of the frames including one or more tags, each of the tags specifying a group identification, a switch identification, and a port identification, wherein the switch is part of a switch group and the switch group is part of a switch network;

means for maintaining routing information in the switch indicating an output one of the ports for each other switch in the switch group;

means for, for each of the frames, operating in a first mode of operation if the frame conforms to the special routing protocol, and, if the frame does not conform, operating in a second mode of operation;

in the first mode of operation:

means for reading a first of the tags in the frame;

means for determining whether the switch identification of the first of the tags corresponds to the switch;

means for, if the switch identification does not correspond to the switch, accessing the routing information to determine the output one of the ports corresponding to the switch identification and transmitting the frame on the determined one of the ports; and     means for transmitting the frame on the one of the ports corresponding to the port identification of the first of the tags if the switch identification corresponds to the switch; and in the second mode of operation, means for processing the frame according to standard routing protocol.

* * * * *